Sept. 6, 1966 ÜSTÜN GERMEN 3,271,026
DOCUMENT STACKING DEVICE
Filed July 1, 1964
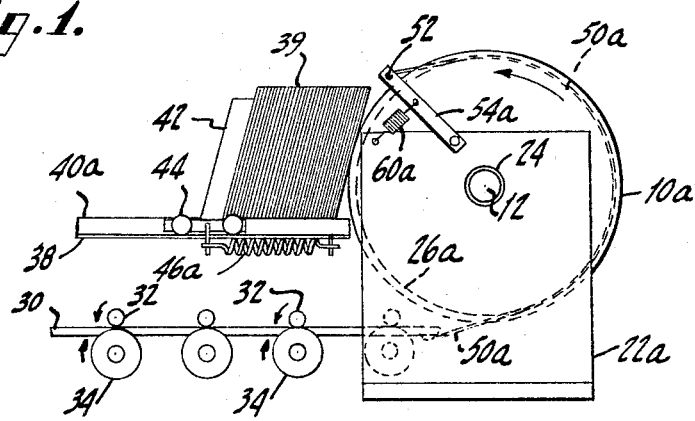
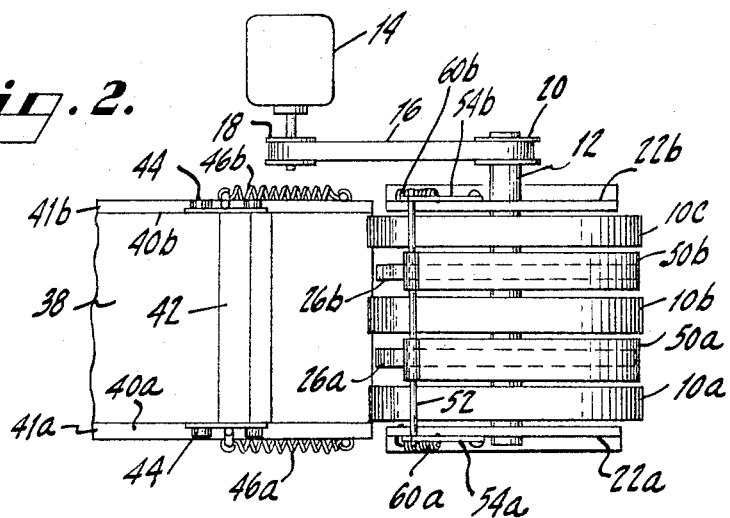
INVENTOR.
ÜSTÜN GERMEN
BY John V. Regan
Attorney

United States Patent Office 3,271,026
Patented Sept. 6, 1966

3,271,026
DOCUMENT STACKING DEVICE
Üstün Germen, Newton Center, Mass., assignor to Radio Corporation of America, a corporation of Delaware
Filed July 1, 1964, Ser. No. 379,451
9 Claims. (Cl. 271—71)

This invention relates to document handling apparatus and, in particular, to an asynchronously operated document stacker device.

Document stackers receive documents fed from a processor, such as a reader, punch, sorter or the like, and stack the documents in an output hopper or bin. Many stacker devices of the prior art use rotary drums having grippers, or fingers, which engage the leading edge of a document and move the document around the drum to the output hopper. In order for such a device to operate properly, the drum is stopped during each cycle with the grippers open and in position to receive an incoming document. Alternatively, if the drum is rotated continuously, its rotation is so synchronized with the processor and document feed means that the grippers are open and in the position to receive an incoming document at the precise moment the document is presented to the drum. The former technique results in a relatively slow document handling rate. The latter technique imposes stringent requirements on system timing and tolerances. In either case, and especially in the latter, the leading edges of the documents often are bent, torn or otherwise mutilated by the grippers.

One object of the present invention is to provide a rotary-type stacking device that does not employ grippers.

Another object of this invention is to provide an improved stacking device that can operate continuously at high speed.

Still another object of this invention is to provide a rotary-type stacking device that operates asynchronously in the sense that its rotation need not be synchronized with the document feed means.

Yet another object of the invention is to provide a document stacker that can be operated selectively on demand.

A preferred embodiment of the invention comprises at least first and second wheels, or disks, of like diameter rotatably mounted on a shaft, and a third wheel of smaller diameter mounted on the shaft between the first and second wheels. A spring-loaded band is wrapped around a portion of the circumferential periphery of the third wheel. One end portion of the band extends outwardly beyond the wheels and across a document feed path. The other end of the band terminates at a point near the input end of a document hopper. A document fed to the wheels is constrained to move between the band and the periphery of the third wheel. Because the third wheel has a smaller diameter than the first and second wheels, the document is pressed against the first and second wheels. The band is chosen to have a lower coefficient of friction than the circumferential peripheries of the first and second wheels, whereby the first and second wheels frictionally drive the document to the hopper.

In the accompanying drawing, like reference characters denote like components, and:

FIGURE 1 is a view of the document stacker and feed means in side elevation; and FIGURE 2 is a plan view of the document stacker.

The document stacker comprises a plurality of wheels 10a . . . 10c, or disks, of a first type, three shown, mounted on and secured to a rotatable shaft 12. Shaft 12 is driven from a motor 14 as, for example, by means of a belt 16 and pulleys 18, 20. Shaft 12 rotates in bearings 24 carried by a pair of side mounting plates 22a, 22b, which may be part of the main frame of the machine. Wheels 10a . . . 10c either are made of a material having a high coefficient of friction, or are coated or covered on their circumferential peripheries with a material having a high coefficient of friction.

Centrally located between each pair of adjacent first wheels 10a . . . 10a is a wheel, or disk, of smaller diameter. Wheel 26a, for example, is mounted on the shaft between wheels 10a and 10b, and wheel 26b is mounted on the shaft between wheels 10b and 10c. The smaller wheels 26a, 26b preferably are loosely fitted on shaft 12 and held in fixed position against rotation (by means not shown). These smaller wheels 26a, 26b may be made from a material having a relatively low coefficient of friction, or coated on their circumferential peripheries by a low coefficient of friction material if relatively thin and flexible documents are to be stacked. If standard record cards, e.g. Hollerith cards, are employed, the material content of the smaller wheels is not of importance, as will be discussed later.

Documents are fed along the top surface of a guide plate 30 toward the wheels by means of several sets of upper and lower rollers, 32, 34, respectively, at least one of which is power driven. The upper surface of the guide plate 30 is substantially tangent to the larger wheels 10a . . . 10c.

An output hopper, or document stacking bin, is located with its input end adjacent the wheels, and comprises a bottom plate 38 on which the documents 39 rest. Plate 38 has a pair of upstanding flanges 40a, 40b extending along the length thereof near opposite side edges. These flanges 40a, 40b may serve as the side members of the hopper. In addition, the flanges 40a, 40b serve as side walls for a pair of tracks 41a, 41b, best seen in FIGURE 2. A hopper backing plate 42 is mounted on wheels 44 which ride on the aforementioned tracks and are guided by the flanges 40a, 40b. The backing plate 42 is biased toward the large wheels 10a . . . 10c by means of a pair of bias springs 46a, 46b pinned at the front end of the hopper.

Each of the smaller wheels 26a, 26b has a thin, flexible band concentric with a peripheral portion thereof. Each band 50a, 50b is secured at its upper end to a rod 52. Rod 52, in turn, is located near the entrance to the output hopper and is connected at its opposite ends to a pair of arms 54a, 54b pivotally mounted on the side mounting plates 22a, 22b, respectively. The other ends of the flexible bands 50a, 50b project outwardly beyond all of the wheels and across the document feed path, being pinned or otherwise secured at fixed points below the document guide plate 30. The lower ends of the bands 50a, 50b define a throat with adjacent peripheral portions of the wheels 26a, 26b, respectively.

Bands 50a and 50b are spring-loaded by means of bias springs 60a, 60b connected between pivotable arms 54a, 54b and the side mounting plates 22a, 22b, respectively. The bias provided by the springs 60a, 60b preferably is such that the bands 50a and 50b are biased against their respective wheels 26a, 26b. For this reason, it is desirable that the wheels 26a, 26b be loosely mounted on shaft 12 and held in fixed position against rotation. Smaller wheels 26a, 26b function to determine the positions of bands 50a, 50b, respectively, when there is no document in the stacker. In any event, the inner surfaces of bands 50a and 50b are located at a radial distance from shaft 12 that is less than the distance of the periphery of any of the larger wheels 10a . . . 10c from the shaft 12. In the drawing, the relative dimensions and radial location of the bands is exaggerated for clarity of drawing. In actual practice, the smaller wheels 26a and 26b may have an outside diameter that is about 0.02 inch smaller than the diameters of the wheels 10a . . . 10c, and the bands 50a, 50b may have a thickness of about 0.01 inch. The bands may be made of sheet metal, for example, and the inner surfaces thereof have a relatively low coefficient of friction as compared with the peripheries of the larger wheels 10a ... 10c.

Consider now the operation of the stacker. Shaft 12 may be driven continuously by the motor 14. The larger wheels 10a ... 10c rotate continuously with no slippage when the shaft 12 is rotated. A document (not shown) is fed along the upper surface of guide plate 30 toward the wheels by the sets of rollers 32, 34. The set of rollers closest to the document stacker drives the document into the throat defined by the bands 50a, 50b and the adjacent peripheral portions of the wheels 26a, 26b. The bands 50a, 50b spread outwardly against the force of the bias spring 60a, 60b to accommodate the document between the bands and the wheels 26a, 26b.

For a relatively thin and flexible document, the document is held against the peripheries of the smaller wheels 26a, 26b by the bands. Because these later wheels are smaller in diameter than the wheels 10a ... 10c, the document flexes and is pressed against the outer peripheries of the larger wheels 10a ... 10c. Since the outer surfaces of these large wheels have a higher coefficient of friction than the bands 50a, 50b and wheels 26a, 26b, the document is frictionally driven by the large wheels 10a ... 10c. The larger wheels 10a ... 10c rotate at a surface speed which is equal to the normal document feed speed, and move the document along a circumferential path to the entrance of the output hopper, whereupon the document emerges from the spring-loaded end of the bands 50a, 50b and enters the gap between the wheels 10a ... 10c and the backing plate 42.

The document continues to be frictionally driven by the large wheels 10a ... 10c until its leading edge contacts the bottom plate 38 of the hopper. Bottom plate 38 is located from the spring-loaded end of the bands 50a ... 50b at a distance which is slightly greater than the height of the document, whereby the trailing edge of the document is clear of the bands 50a, 50b when the leading edge of the document is resting on the hopper plate 38. This allows the trailing edge of the document to flip away from the wheels 10a ... 10c and against the backing plate 42, or against other documents 39 located in the hopper.

For thicker documents, such as Hollerith cards, the document does not contact the peripheries of the smaller wheels 26a, 26b during rotational feeding. This is due to the fact that as the card is curved around the large wheels 10a ... 10c, it becomes much "stiffer" and resists flexing in the transverse direction. In that event, the coefficient of friction of the smaller wheels 26a, 26b becomes immaterial.

Operation of the document stacker is asynchronous in the sense that wheels 10a ... 10c are always ready to receive a document fed by the rollers 32, 34, provided that the angular speed of rotation of wheels 10a ... 10c is sufficient. These wheels preferably rotate at a surface speed equal to the normal speed of document feed. Rotation of the wheels 10a ... 10c is completely independent of the timing of the document processor (not shown) and feed rollers as there are no grippers, or fingers, on the wheels which must grip a document. The thickness of the documents being handled may vary over wide limits, since the flexible bands 50a, 50b will spread outwardly away from the wheels 26a, 26b an amount sufficient to accomodate the document. Also, because there are no grippers or fingers, the stacker device is able to handle documents even if they are fed to the stacker with some skew.

What is claimed is:

1. The combination comprising:
first and second wheels rotatably mounted on a shaft;
a third wheel, smaller in diameter than the first and second wheels, mounted on said shaft between said first and second wheels;
a document hopper having an input end located adjacent said wheels;
a band concentric with a peripheral portion of said third wheel at a radial distance from said shaft that is less than the radii of said first and second wheels;
one end of said band extending beyond the peripheries of all of said wheels and being operatively connected at a fixed point, said one end of said band and the adjacent peripheral portion of said third wheel defining a throat for documents;
means operatively connecting the other end of said band to a fixed point near the input end of said hopper;
the peripheries of the first and second wheels having a higher coefficient of friction than said band;
means for feeding a document into said throat; and
means for rotating said first and second wheels.

2. The combination comprising:
first and second wheels rotatably mounted on a shaft and spaced from one another;
a third wheel mounted on said shaft between said first and second wheels, and having a diameter smaller than the diameters of the first and second wheels;
a document hopper having an input end adjacent said wheels;
means wrapped around a portion of the periphery of said third wheel, connected at one end to a first fixed point near said input end of said hopper, the other end of said means extending outwardly beyond all of said wheels to a second fixed point and forming a throat with the periphery of said third wheel;
the peripheries of said first and second wheels having a higher coefficient of friction than said means; and
means for feeding a document into said throat.

3. The combination comprising:
first and second wheels of like diameter fixedly mounted on a rotatable shaft and spaced from one another;
a third wheel of smaller diameter mounted on said shaft between said first and second wheels;
a document hopper having an input end adjacent said wheels;
a spring-loaded band operatively coupled at one end to a first fixed point near said input end of said hopper and being wrapped around a portion of the periphery of said third wheel, the other end of said band extending outwardly beyond all of said wheels to a second fixed point and forming a throat with the periphery of said third wheel;
the peripheries of said first and second wheels having a higher coefficient of friction than said band; and
means for feeding a document into said throat.

4. The combination comprising:
first and second wheels of like diameter fixedly mounted on a rotatable shaft;
a third wheel of smaller diameter loosely mounted on said shaft between said first and second wheels;
a document hopper having an input end located adjacent said wheels;
a band operatively connected at one end to a first fixed point near the input end of said hopper and being wrapped around a portion of the periphery of said third wheel, the other end of said band extending outwardly beyond the peripheries of all of said wheels and being operatively connected at a second fixed point, said other end of said band forming a throat with the periphery of said third wheel;
means biasing said band against said third wheel;
the peripheries of said first and second wheels having a higher coefficient of friction than said band; and
means for feeding a document into said throat.

5. The combination as claimed in claim 4, including means for holding said third wheel in a fixed position, and means for rotating said shaft.

6. The combination comprising:

first and second wheels of like diameter rotatably mounted on a shaft and spaced from one another;
a third wheel of smaller diameter mounted on said shaft between said first and second wheels;
a document hopper having an input end adjacent said wheels;
a spring-loaded band operatively coupled at one end to a first fixed point near said input end of said hopper and being wrapped around, and biased against, a portion of the periphery of said third wheel, the other end of said band extending outwardly beyond all of said wheels to a second fixed point and forming a throat with the periphery of said third wheel;
said band being smaller in width than the spacing between said first and second wheels;
the peripheries of said first and second wheels having a higher coefficient of friction than said band; and
means for feeding a document into said throat, said document having a dimension, in a direction normal to the direction of feed, that is greater than the spacing between the first and second wheels.

7. The combination comprising:
first and second wheels fixedly mounted on a rotatable shaft and being axially spaced from one another;
a document receiving station having an input adjacent said wheels;
a document feed path;
a band located between said first and second wheels at a radial distance from said shaft that is less than the radii of the first and second wheels;
means operatively coupling one end of said band to a fixed point near the input of said hopper, the other end of said band extending outwardly beyond said wheels and across the document feed path;
the peripheries of said first and second wheels having a higher coefficient of friction than said band;
and means for feeding documents along said path toward said wheels.

8. The combination comprising:
first and second wheels fixedly mounted on a rotatable shaft and being axially spaced from one another;
a third wheel, smaller in diameter than the first and second wheels, mounted on said shaft between the first and second wheels;
a document receiving station having an input adjacent said wheels;
a document feed path substantially tangent to said first and second wheels;
a band concentric with a peripheral portion of said third wheel at a radial distance from said shaft that is less than the radii of the first and second wheels;
means operatively coupling one end of said band to a fixed point near the input of said hopper, the other end of said band extending outwardly beyond said wheels and across the document feed path;
the peripheries of said first and second wheels having a higher coefficient of friction than said band;
and means for feeding documents along said path toward said wheels.

9. The combination comprising:
first and second wheels fixedly mounted on a rotatable shaft and being axially spaced from one another;
a third wheel, smaller in diameter than the first and second wheels, mounted on said shaft between the first and second wheels;
a document receiving station having an input adjacent said wheels;
a document feed path;
a band concentric with a peripheral portion of said third wheel at a radial distance from said shaft that is less than the radii of the first and second wheels;
means operatively coupling one end of said band to a fixed point near the input of said hopper, the other end of said band extending outwardly beyond said wheeels and across the document feed path;
the peripheries of said first and second wheels having a higher coefficient of friction than said band;
means biasing said band against said peripheral portion of said third wheel; and
means for feeding documents along said path toward said wheels.

References Cited by the Examiner
UNITED STATES PATENTS

| | | |
|---|---|---|
| 1,385,468 | 7/1921 | Pflange. |
| 3,140,089 | 7/1964 | Greenblott _____ 271—71 X |
| 3,194,550 | 7/1965 | Goertz _____ 271—3 |

M. HENSON WOOD, JR., *Primary Examiner.*

J. N. ERLICH, *Assistant Examiner.*